United States Patent [19]
Talan

[11] 3,832,931
[45] Sept. 3, 1974

[54] DEVICE FOR FASTENING OBJECTS TO WALLS OR OTHER SUPPORTS

[76] Inventor: Maryan Talan, 68 Rue Bonaparte, 75 Paris, France

[22] Filed: Dec. 19, 1972

[21] Appl. No.: 316,557

[30] Foreign Application Priority Data
Dec. 21, 1971 France .............................. 71.45832

[52] U.S. Cl. ........................................ 85/83, 85/84
[51] Int. Cl. ............................................ F16b 13/06
[58] Field of Search ......... 85/83, 84, 85, 87, 73–76, 85/63

[56] References Cited
UNITED STATES PATENTS

| | | | |
|---|---|---|---|
| 1,234,487 | 7/1917 | Raeger.................................... | 85/83 |
| 2,616,328 | 11/1952 | Kingsmore............................. | 85/83 |
| 3,188,905 | 6/1965 | Millet..................................... | 85/84 |
| 3,385,158 | 5/1968 | Morin..................................... | 85/84 |

FOREIGN PATENTS OR APPLICATIONS
1,469,966   1/1967   France................................... 85/73

Primary Examiner—Marion Parsons, Jr.
Attorney, Agent, or Firm—Michael S. Striker

[57] ABSTRACT

Device for fastening an object to a wall or support, of the type comprising an expansible peg adapted to be inserted into a hole formed in said wall or support, and an expansion plug adapted to be driven home into said peg and formed with notches or the like for anchoring said plug in said peg. The peripheral surface of the plug of said device and the inner wall of the corresponding peg are both divided into at least two separate areas extending longitudinally thereto, namely a first area comprising a series of anchoring teeth or notches or the like distributed through the whole or part of the length of said plug and peg, and a second plain slip area which, in the plug, constitutes an expansion ramp on at least one portion of its length.

3 Claims, 7 Drawing Figures

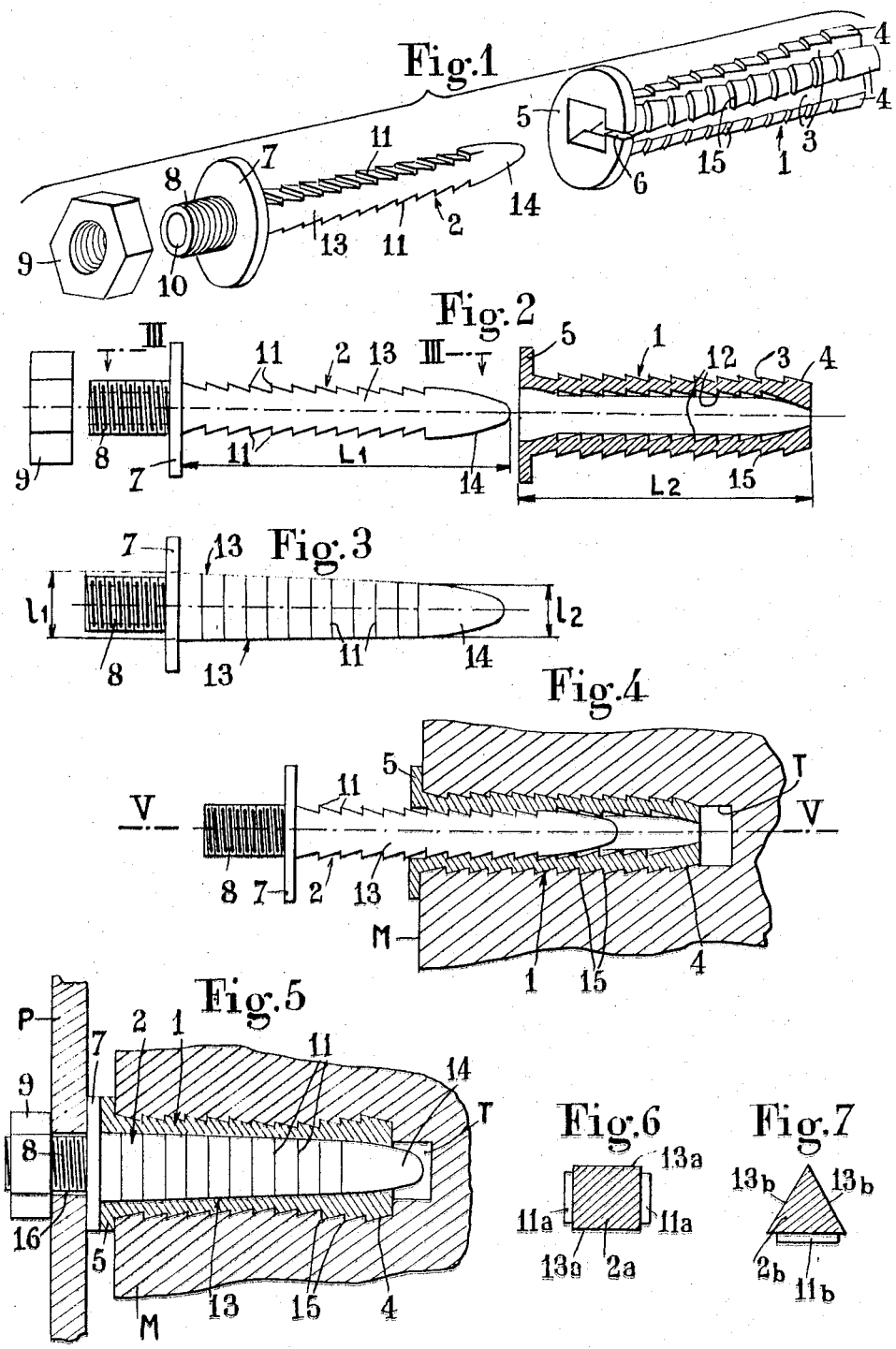

DEVICE FOR FASTENING OBJECTS TO WALLS OR OTHER SUPPORTS

The present invention relates to devices of the type intended for fastening any article or object to a support not permitting the direct engagement of a screw or like fastening members into it. This is observed notably when it is desired to fasten an object to a wall comprising a layer of plaster of Paris or other friable material.

More particularly, this invention relates to fastening devices of the type comprising in combination an expansible peg adapted to be driven into a hole formed beforehand in the support or wall, and an expansion plug adapted to be driven into the expansible peg for wedging same in position, the rear end of said expansion plug being allowed to project from said peg so that it can be used for hanging or supporting or fastening the object to be secured in position. The plug is retained in the corresponding peg by anchoring teeth formed on the outer periphery of said plug and adapted to co-act with corresponding notches or grooves formed in the inner surface of said peg.

However, hitherto known devices of this character do not provide a really efficient wedging of the corresponding peg in its recess or cavity. This is due to the fact that the anchoring notches or teeth ensuring the mutual engagement of said internal plug and the peg consist of annular ribs formed on the outer surface of the plug and adapted to engage corresponding grooves formed in the inner wall of the peg.

Under these conditions, when the plug is driven into the peg, the ribs of the former cause a certain expansion of the latter before engaging the grooves formed in the inner wall thereof. Therefore, this expansion is attended by a certain divergence of the longitudinal sections of the peg which comprises as a rule a plurality of longitudinal slits along at least one fraction of its length. However, this expansion is only momentary and followed immediately by a reaction of the peg on itself when the plug ribs engage the corresponding grooves of the peg.

Now this effect is observed several times during the driving of the peg to its final position. As a consequence, a stress is exerted repeatedly on the walls of the cavity formed in the support or wall, thus widening the cross-sectional area of said cavity. Now, when the plug has attained its end position, the aforesaid anchoring ribs are fitted in the corresponding grooves of the peg, so that the latter assumes a retracted condition corresponding to its final position. As a result, in this final position a certain clearance has developed between the peg and the inner wall of said cavity, so that the wedging action produced by the device is rather limited. Consequently, the possible applications of fastening devices of this type are also limited, notwithstanding the number of advantageous features characterising these devices from a practical point of view, in comparison with conventional pegs for fastening screws.

It is therefore the essential object of the present invention to provide a device of the type broadly set forth hereinabove but designed with a view to avoid the inconveniences mentioned in the foregoing.

To this end, the fastening device of the present invention is characterised essentially in that the peripheral wall of the plug element of the device and the inner wall of the corresponding peg are divided into at least two separate areas extending longitudinally, namely a first area comprising a series of anchoring teeth or notches, or the like, distributed along the whole or part of the length of the element, and a second area having a smooth slip surface which, on the plug element, constitutes an expansion ramp covering at least one portion of its length.

Thus, when driving this plug into the corresponding peg the notched or toothed anchoring areas of the adjacent walls of these two elements are caused to register with each other; however, as the corresponding teeth and notches become mutually engaged as the plug is driven into the peg, the plain portions of these two elements slip on each other and remain in close contact.

This arrangement is advantageous in that during the plug driving movement the peg is prevented from contracting on itself several times and eventually assumes a stable, retracted end position. In fact, with the device of the present invention the peg is expanded continuously and remains in its expanded condition when its final position is attained, so that the peg is efficiently wedged in its cavity.

Other features and advantages of this device will appear as the following description proceeds with reference to the accompanying drawing, in which:

FIG. 1 is a perspective view of the component elements of the fastening device of the present invention;

FIG. 2 is a part-sectional, part-elevational view of the same elements prior to the assembling thereof;

FIG. 3 is a plane view from above of the inner plug, as seen in the direction of the arrows III—III of FIG. 2;

FIG. 4 is a longitudinal section taken along the same plane as FIG. 2 and illustrating the action produced by the introduction of the plug into the peg;

FIG. 5 is a sectional view taken along the line V—V of FIG. 4, showing the relative positions of the elements after the plug has been driven home, and FIGS. 6 and 7 are cross-sectional views showing two different shapes of the inner plug of the device.

As already mentioned hereinabove, the device comprises essentially an expansible peg designated in general at 1, and an expansion and anchoring plug also designated in general at 2.

The peg 1 consists of deformable material such as moulded plastic. This peg is hollow and formed with a plurality of longitudinal slits 3 extending throughout its length or at least along one fraction thereof. These slits form therebetween separate sectors 4 adapted to diverge during the peg expansion.

All these sectors are interconnected at the rear end of the peg, i.e., at the end opposite to the end firstly engaged into the hole formed for constituting the peg cavity. Besides, at its rear end, this peg comprises a flange or collar portion 5 adapted to act as an abutment when driving the peg into a hole. This flange 5 may also comprise a radial slit 6, but the latter may also be dispensed with.

On the other hand, it may be noted that the aforesaid slits 3 may be replaced by relatively thin wall portions interconnecting the various sectors 4 and adapted to be torn to permit the movement of these sectors away from each other when the peg is expanded as a consequence of the introduction of plug 2.

At its rear end the plug comprises a flange or collar 7 adapted to engage the peg flange 5 when the two elements are assembled. On its rear face this flange 7 carries a screw-threaded stud 8 so that a nut 9 can be screwed thereon. In fact, this stud is intended to remain outside the peg during the complete insertion of the plug so that said stud can be used as a fastening member proper by engaging a hole formed to this end in the object to be secured in position by means of the device of this invention.

However, this stud also comprises a blind hole 10, which may be tapped or not, and adapted to receive a screw also for the purpose of securing the corresponding object in position.

The plug 2 has preferably a polygonal cross-sectional contour, for example a rectangular contour, the same contour being contemplated for the peg cavity.

On two opposite faces of the plug body a continuous series of anchoring teeth, for instance of buttress-thread or gullet-teeth configuration, and similar teeth but of opposite orientation, as shown at 12, are formed on the opposite faces of the inner wall of peg 1.

The other two faces 13 of the plug are plain but inclined to constitute expansion ramps capable of increasing the plug thickness in the direction of the rear end of said plug.

Due to this slope, the width $L_1$ of the notched faces 11 is greater at the rear end than the width $L_2$ of the same faces at their point of mergence into the front portion 14 of said plug.

The inner cavity of peg 1 is also formed with a pair of plain opposite faces adapted to engage the ramps 13 of the expansion plug.

Although the inner cavity of this peg has a polygonal cross-sectional contour, the outer contour thereof is preferably circular in order to facilitate the drilling of the hole T to be subsequently used for receiving this peg in a wall or any other support M.

Advantageously, the outer wall of this peg may comprise a series of indentations or notches 15 adapted to anchor same to the inner wall of said hole T. These indentations or notches may have for example the profile of gullet-teeth or buttress threads.

The length $L_1$ of the body of plug 2 which is to be driven into the peg 1 is greater than the peg length $L_2$. Thus, when the plug is driven home into the peg its inner end or point 14 projects from the corresponding end of the peg. Now the outer wall of this inner end of plug 2 has a pronounced slope in order to produce a marked expansion of the corresponding end of the peg. To this end, the inner end of the plug may be ogival and merge into the four sides 11 and 13 of the plug body.

To secure a panel P to the wall or like support M by means of the device of this invention, it is necessary firstly to drill a hole T through this wall M for inserting the peg 1. The diameter of this hole corresponds substantially to the outer diameter of the peg. Then, the peg 1 is dirven into the hole until its flange 5 abutes the outer surface of wall or support M. Subsequently, the expansion plug 2 is driven home into the peg 1.

During this last driving operation the teeth 11 of the plug engage in succession the various notches or teeth 12 of the inner wall of said peg, but at the same time the plain faces 13 of the plug slide along the plain faces of the peg, thus preventing the peg from retracting on itself when the plug teeth 11 engage the peg notches.

Under these conditions, the peg is not caused to perform successive retraction movements between as many expansion movements as currently observed with hitherto known devices of the same character. Thus, the inconveniences mentioned in the foregoing are safely avoided, notably the development of a certain play between the peg and the wall of its cavity or hole T.

Besides, due to the sloping of the plain faces 13 of the plug, the peg undergoes a certain expansion only when the plug has been introduced to a sufficient extent into it. In fact, the surface area of the various plug sections is greater than that of the corresponding sections of the peg when the latter is unstressed.

As a result, the peg expands when the plug is driven home, thus causing the sectors 4 to diverge and cause a safe wedging of the peg in its cavity T. Besides, this expansion is more accentuated at the leading or inner end of the peg because the corresponding portion of the inner cavity of the peg itself is constricted at this end. As a result, the leading or inner end of the peg is somewhat expanded or swollen in the hole T, but improving the reliable wedging of the peg.

On the other hand, the plug 2 is strongly anchored in the peg 1 due to the mutual engagement of teeth 11 and 12, thus precluding any accidental, untimely or undesired removal of the plug.

Under these conditions, the outer stud 8 of the plug may be used as a fastening member by engaging a hole 16 formed in the object P to be secured in position, the nut 9 being subsequently screwed on said stud.

However, it is also possible to secure the object P by using a screw engaging the blind tapped hole 10 formed in said stud 8.

Stress may also be laid on the fact that this fastening device is considerably more advantageous than a conventional peg adapted to receive a simple screw. In fact, in the case of conventional pegs, various sizes must be provided for accomodating different screw diameters, otherwise the desired wedging effect would not be obtained. In contrast thereto, with the device of this invention a more or less pronounced play may exist about the stud 8, so that a same type of fastening device may be used for holding in position objects having through holes of different sizes.

Of course, when introducing the plug into the peg 1, care must be taken that the teeth 11 register with teeth 12, and that consequently the plain faces 13 of the plug register with the corresponding faces of the inner wall of said peg. However, this orientation is easily found because the peg 2 has a rectangular cross-sectional shape on account of the inclination of its plain faces 13. Besides, this rectangular shape could be accentuated as illustrated in FIG. 6. In fact, this Figure illustrates in cross-sectional view a plug 2a of which the rectangular cross-sectional contour comprises a pair of plain faces 13a of a width considerably greater than that of the other two faces in which the anchoring teeth 11a are formed. Of course, the inner cross-sectional contour of the corresponding peg has a corresponding shape.

However, the cross-sectional contour of the plug and that of the inner cavity of the peg should not be construed as being strictly limited by this rectangular shape. In fact, these contours may have any other polygonal shape, for example a triangular shape, as illustrated in FIG. 7. Thus, this Figure illustrates in cross-section a triangular-sectionel plug 2b having two plain faces 13b and a third face formed with anchoring teeth 11b. Of course, the same applies to the inner wall of the corresponding peg.

On the other hand, the inner peg could also have a round or curved cross-sectional shape instead of a polygonal shape, provided only that the outer surface of the plug be in all cases divided into at least two separate areas in the longitudinal direction, namely a first area formed with a series of anchoring teeth and a second, plain area acting as an expansion ramp. The same applies to the inner wall of the relevant peg.

Possibly, the plain faces or areas of the plug body may be free of any slope through their length. In fact, the inclination of these faces or other areas may be contemplated only for one fraction of its length, for example at the front or inner end of the plug, as this would be amply sufficient for safely wedging the peg in its cavity or hole.

In fact, it will readily appear to those conversant with the art that the fastening device according to this invention should not be construed as being strictly limited to the specific forms of embodiment described and illustrated herein, since various modifications may be brought thereto without departing from the basic principles of the invention as set forth in the appended claims. Thus, other shapes may be contemplated. Besides, the component elements of this device may be manufactured from any suitable material, outside the suitable plastic materials; for instance, metal or metal alloys may be used to advantages in certain applications.

As already mentioned in the foregoing, this device may be used for securing any objects to a wall or other support whenever, inter alia, this fastening operation cannot be carried out by using directly a screw or other similar member.

What I claim is:

1. A device for fastening an object to a support comprising an expansible peg having a peg cavity and adapted to be inserted into a hole formed in said support; an expansion plug adapted to be inserted into said peg cavity, the cross-sectional contour of said plug and the cross-sectional contour of said peg cavity having a polygonal, matching configuration so that the outer surface of said plug and the surface of said peg cavity are composed of corresponding elongated pairs of corresponding faces on said plug and on said surface of said peg cavity; complementary anchoring teeth formed on at least one of said elongated faces of said plug and on the corresponding face of said peg cavity, the other faces of said plug and of said peg cavity being plain and at least one said plain face on said plug constituting at least one expansion ramp along part of the length of said plug.

2. Fastening device according to claim 1, in which the rear end of said plug comprises a flange acting as an abutment when the plug is being inserted into the peg, said flange carrying externally a screw-threaded stud formed with a central tapped blind hole, said stud being adapted to act as a fastening member proper.

3. A device according to claim 1 in which the length of said plug is greater than the length of said peg, the leading end of said plug sloping strongly in order to produce an expansion of the peg end when said plug is inserted into said peg.

* * * * *